(12) United States Patent
Greyer

(10) Patent No.: US 12,399,698 B2
(45) Date of Patent: Aug. 26, 2025

(54) UPGRADING OR UPDATING A SOFTWARE APPLICATION

(71) Applicant: Siemens Healthineers AG, Forchheim (DE)

(72) Inventor: Stephan Greyer, Erlangen (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 126 days.

(21) Appl. No.: 17/855,954

(22) Filed: Jul. 1, 2022

(65) Prior Publication Data

US 2023/0004378 A1     Jan. 5, 2023

(30) Foreign Application Priority Data

Jul. 5, 2021   (DE) ..................... 10 2021 207 046.9

(51) Int. Cl.
*G06F 8/65* (2018.01)
*G06F 9/445* (2018.01)
*G06F 9/455* (2018.01)
*G06F 11/3668* (2025.01)

(52) U.S. Cl.
CPC ................ *G06F 8/65* (2013.01); *G06F 9/445* (2013.01); *G06F 9/455* (2013.01); *G06F 11/3688* (2013.01)

(58) Field of Classification Search
CPC ....................................................... G06F 8/65
See application file for complete search history.

(56) References Cited

U.S. PATENT DOCUMENTS

| | | | | |
|---|---|---|---|---|
| 5,633,843 A | * | 5/1997 | Gupta | G11B 19/02 |
| 10,521,312 B1 | * | 12/2019 | Nikhil | G06F 11/1469 |
| 2004/0172578 A1 | * | 9/2004 | Chen | G06F 11/1417 |
| | | | | 714/E11.133 |
| 2010/0235829 A1 | * | 9/2010 | Shukla | H04L 67/34 |
| | | | | 717/177 |
| 2011/0208929 A1 | | 8/2011 | McCann | |
| 2011/0265183 A1 | * | 10/2011 | Wu | G06F 21/74 |
| | | | | 718/1 |
| 2014/0033189 A1 | * | 1/2014 | Buswell | G06F 9/45558 |
| | | | | 717/170 |
| 2014/0244309 A1 | * | 8/2014 | Francois | G16H 50/20 |
| | | | | 705/2 |
| 2015/0339149 A1 | | 11/2015 | Tian et al. | |
| 2019/0335033 A1 | * | 10/2019 | Huang | G06Q 10/30 |

* cited by examiner

*Primary Examiner* — Jae U Jeon
(74) *Attorney, Agent, or Firm* — Harness, Dickey & Pierce, P.L.C.

(57) ABSTRACT

In a computer-implemented method for upgrading or updating a software application installed on a host system, a first map of an operating system of the host system is generated. The operating system of the host system is started inside a virtual machine environment using the first map, and the software application is updated or upgraded in the virtual machine environment. A second map of the operating system in the current state with the updated or upgraded software application is generated in the virtual machine environment, and the second map of the operating system is loaded inside the host system.

16 Claims, 2 Drawing Sheets

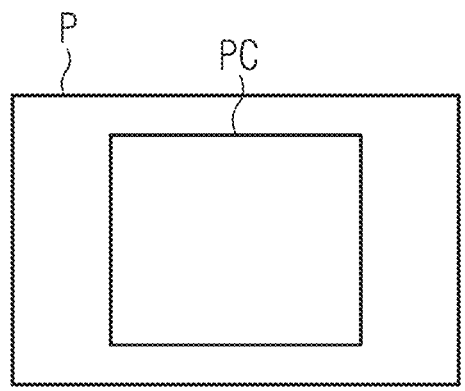
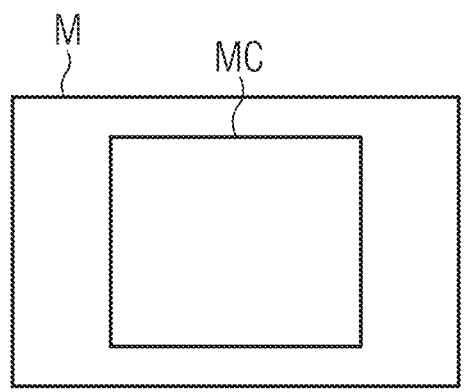

UPGRADING OR UPDATING A SOFTWARE APPLICATION

CROSS-REFERENCE TO RELATED APPLICATION(S)

The present application claims priority under 35 U.S.C. § 119 to German Patent Application No. DE 10 2021 207 046.9, filed Jul. 5, 2021, the entire contents of which are incorporated herein by reference.

FIELD

Embodiments of the present invention relate to a computer-implemented method for upgrading or updating a software application and to a corresponding apparatus. In particular, embodiments of the present invention relate to updating or upgrading software applications in the medical sector.

BACKGROUND

Users can be provided with software programs at least partially online without the user having to locally store all necessary data. For example, in the case of Software-as-a-Service (SaaS) a service provider provides software applications, for instance access to databases, management software and the like.

Image diagnosis software can thus be provided in the medical sector, which can be also used, for instance, with mobile end devices without particular hardware requirements. A powerful, quantitative evaluation can be outsourced, so local computing power can be saved. In addition, a relatively large amount of data can also be provided without excessive demands on local storage space.

The software can be provided in the framework of a virtual network, which comprises a plurality of virtual machines. The virtual network can be managed and maintained by the service provider. Updates or upgrades in particular are also necessary for this. Occasional updates or upgrades are also necessary in the case of locally installed applications in order to keep the software application up-to-date.

An exemplary method for upgrading virtual machine (VM) software is known from US 2015/0339149 A1. For this purpose, a central management server creates a virtual infrastructure. A first template VM is created and cloned. If an upgrade is available a second template VM is generated. By removing and generating logical links, a virtual operating system, which includes the upgrade, is incorporated.

US 2011/0208929 A1 is based on virtualized systems, wherein a virtual image is shifted to a newly created partition.

SUMMARY

In the case of more extensive updates or upgrades, the installation can take a relatively long time, for instance several hours. In the process it must be ensured that no changes are lost in application-specific database files. During the update or upgrade the software applications are thus typically no longer available. The user frequently depends on being able to use the software application without interruption, however. For example, it is disadvantageous in the medical sector if a software application used for diagnosis is no longer available for a relatively long period, for instance one lasting several hours.

It is possible to postpone the updates or upgrades, for instance until the next weekend. In particular, in the case of safety-critical updates or upgrades it is less practical, however, to postpone the update or upgrade for a relatively long time.

Embodiments of the present invention therefore to make the installation process more pleasant for the user. In particular, the situation should be avoided where the software application cannot be used by the user for a relatively long time owing to the update or upgrade.

Embodiments of the present invention provide a computer-implemented method for upgrading or updating a software application and to a corresponding apparatus. Embodiments of the present invention relate, moreover, to a computer program product and to a non-volatile, computer-readable storage medium.

In accordance with a first aspect, embodiments of the present invention relate to a computer-implemented method for upgrading or updating a software application, wherein the software application is installed on a host system. A first map of an operating system of the host system is generated. The operating system of the host system is started inside a virtual machine, VM, environment using the first map. The software application is updated or upgraded in the VM environment. A second map of the operating system is generated in the VM environment in the current state with the updated or upgraded software application. The second map of the operating system is loaded inside the host system.

In accordance with a second aspect, embodiments of the present invention relate to an apparatus with a storage facility with an operating system with data relating to a software application. The apparatus also comprises a computing facility, which is adapted to execute the software application. For upgrading or updating the software application, the computing facility is also adapted

- to generate a first map of the operating system;
- to start the operating system inside a virtual machine, VM, environment using the first map;
- to update or upgrade the software application in the VM environment;
- to generate a second map of the operating system with the updated or upgraded software application in the VM environment; and
- to load the second map of the operating system outside of the VM environment.

Embodiments of the present invention makes it possible to carry out the majority of the installation of the updates or upgrades in the background. The user can continue to use the software application during this time. In particular, the user can also store user-specific data in a corresponding database without the progress being lost. In particular, the actual update or upgrade of the data relating to the software application is carried out inside the VM environment. Only loading of the second map is then executed on the host system, although typically requires much less time than the actual update or upgrade procedure. The time during which the software application is not available to the user can be drastically reduced thereby. In particular urgent, for instance system-critical, updates or upgrades can be loaded quickly and without great interference.

Loading of the updates or upgrades can also be carried out without security problems in respect of the user-specific data. In particular, the database with user-specific data remains on the host system.

The term "update" is taken to mean an update, which provides slight improvements or eliminates errors. An "upgrade" refers to more major changes, for instance about a changed or expanded range of functions. An update thus refers to a new version, whereas an upgrade relates to a new variant of the software application with technical innovations.

The "software application" can in principle relate to any program, which is executed on the host system. For example, it can be a software application used in the medical sector, for instance for the diagnosis of patient data.

The data, which relates to the software application, can comprise, for example, installation files of the software application, which are stored on a partition of the host system. The data, which relates to the software application, can also comprise database data, moreover, which is stored on the same partition or on a different partition of the host system. The database data can be user-specific, for instance patient data or diagnostic data for the example of a software application used in the medical sector.

The first or second map is an image, as can also be applied for instance for backups of partitions.

In accordance with one embodiment of the method for upgrading or updating the software application, generating the first map of the at least one partition of the host system comprises generating a backup of the operating system of the host system. An appropriate hard disk container file with the partition pattern of the hard disk of the host system is generated for at least one hard disk of the host system. The operating system of the host system is restored on a corresponding partition in the hard disk container file with the aid of the backup of the operating system. In the VM environment the hard disk container file can thus be mounted in such a way that when starting the VM environment a copy of the host system with corresponding hard disk and partition structure is started in the VM environment. The software application is thus updated or upgraded inside the VM environment analogously to an update or upgrade customary in the prior art directly on the host system.

In accordance with one embodiment of the method for upgrading or updating the software application, further database files and/or installation files for updating or upgrading the data relating to the software application is stored in the container file. As a result, the update or upgrade mechanisms can also be tested in the VM environment with the database present on the host system in order to identify potential installation errors early and minimize the risk for the user. The database files can be, for example, patient-specific data. It can be provided, however, that the database files are not overwritten when the second map is loaded, and instead the database files that have remained on the host system and have possibly been revised in the meantime are retained.

In accordance with one embodiment of the method for upgrading or updating the software application, firstly a function test of the software application is carried out inside the VM environment before generating the second map. It is consequently possible to ensure that the update or upgrade has been successfully carried out. Since the data, which is assigned to the software application, is available substantially identically inside the VM environment, it is consequently also possible to ensure that the software application can also be executed on the host system without errors following the upgrade or update when subsequently loading the second map.

In accordance with one embodiment of the method for upgrading or updating the software application, the second map is only generated if the function test of the software application and the installation is successful. If the function test of the software application or the installation procedure indicates that an error occurs, an error message can be output to a user. The method for upgrading or updating the software application can also be terminated to release resources of the host system.

In accordance with one embodiment of the method for upgrading or updating the software application, database data of the host system, which relates to the software application, is retained when loading the second map. The user can thus also continue to use the software application during the majority of the installation without the threat of loss of data. The time during which the software application is not available can be significantly reduced therefore.

In accordance with one embodiment of the method for upgrading or updating the software application, an error message is output if the updating or upgrading of the data relating to the software application inside the VM environment takes longer than a predefined maximum duration. If the time, which has elapsed since the beginning of the update or upgrade procedure, exceeds a predefined threshold value, for instance a multiple of the typically expected time, which can be strictly specified as a function of the update or upgrade, the error message is output. The method for upgrading or updating the software application can then also be automatically terminated so the used resources of the host system are released again. It can also be provided that individual sub-steps, for instance steps preceding or following the update or upgrade, have a separate timeout.

In accordance with one embodiment of the method for upgrading or updating the software application, when an error occurs it can be suggested to the user that they start the procedure or installation process anew in the VM environment with a new map following adjustment of the host system or elimination of the error on the host system.

In accordance with one embodiment of the method for upgrading or updating the software application, the host system is executed in a VM environment. The VM container with the restored map is thus executed inside a nested second VM environment.

In accordance with one embodiment of the method for upgrading or updating the software application, the at least one partition of the host system, from which the first map is generated, contains all data which relates to the software application. In particular, both installation files and personalized files, for instance database files, can be incorporated.

In accordance with one embodiment of the method for upgrading or updating the software application, after predefined time intervals it is possible to check whether an upgrade or update is available. If an upgrade or update is available, the installation of the upgrade or update can be carried out automatically. Alternatively, the user can be informed about the upgrade or update. The user can enter or select a desired installation time.

In accordance with one embodiment of the method for upgrading or updating the software application, a plurality of installations can be carried out simultaneously. Only the installations that proceed without errors are finalized, i.e., the corresponding second maps are actually loaded.

In accordance with one embodiment of the apparatus, the computing facility is adapted to generate a backup of the operating system of the host system, to generate for at least one hard disk of the host system a hard disk container file with the partition pattern of the hard disk of the host system, and to restore the operating system of the host system on a corresponding partition in the hard disk container file with the aid of the backup of the operating system.

In accordance with one embodiment of the apparatus, the computing facility is also adapted to store database files and/or installation files for updating or upgrading the data relating to the software application in the container file.

In accordance with one embodiment of the apparatus, the computing facility is also designed to firstly carry out a function test of the software application inside the VM environment before the creation of the second map. In addition, it can be provided that a user manually carries out an extended test of the software application inside the VM environment before loading the second map on the host system.

In accordance with one embodiment of the apparatus, the computing facility is also adapted to load the second map only if the function test of the software application is successful.

BRIEF DESCRIPTION OF THE DRAWINGS

The above-described properties, features and advantages of the present invention and the manner in which they are achieved will become clearer and more comprehensible in connection with the following description of the exemplary embodiments, which will be explained in more detail in connection with the drawings.
In the drawings:
FIG. 3 shows a schematic block diagram of a computer program product in accordance with one embodiment of the present invention;
and
FIG. 4 shows a schematic block diagram of a non-volatile, computer-readable storage medium in accordance with one embodiment of the present invention.

DETAILED DESCRIPTION

Figure 1:
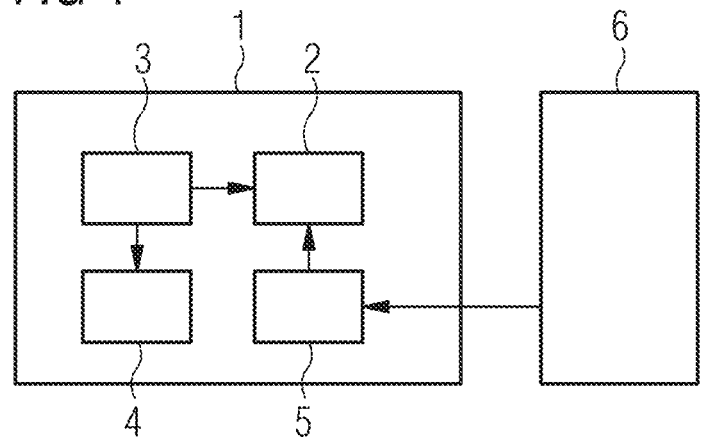
FIG. 1 shows a schematic block diagram of an apparatus in accordance with one embodiment of the present invention.

Embodiments of the present invention provide a computer-implemented method for upgrading or updating a software application and to a corresponding apparatus. Embodiments of the present invention relate, moreover, to a computer program product and to a non-volatile, computer-readable storage medium.

In accordance with a first aspect, embodiments of the present invention relate to a computer-implemented method for upgrading or updating a software application, wherein the software application is installed on a host system. A first map of an operating system of the host system is generated. The operating system of the host system is started inside a virtual machine, VM, environment using the first map. The software application is updated or upgraded in the VM environment. A second map of the operating system is generated in the VM environment in the current state with the updated or upgraded software application. The second map of the operating system is loaded inside the host system.

In accordance with a second aspect, embodiments of the present invention relate to an apparatus with a storage facility with an operating system with data relating to a software application. The apparatus also comprises a computing facility, which is adapted to execute the software application. For upgrading or updating the software application, the computing facility is also adapted
to generate a first map of the operating system;
to start the operating system inside a virtual machine, VM, environment using the first map;
to update or upgrade the software application in the VM environment;
to generate a second map of the operating system with the updated or upgraded software application in the VM environment; and
to load the second map of the operating system outside of the VM environment.

Embodiments of the present invention makes it possible to carry out the majority of the installation of the updates or upgrades in the background. The user can continue to use the software application during this time. In particular, the user can also store user-specific data in a corresponding database without the progress being lost. In particular, the actual update or upgrade of the data relating to the software application is carried out inside the VM environment. Only loading of the second map is then executed on the host system, although typically requires much less time than the actual update or upgrade procedure. The time during which the software application is not available to the user can be drastically reduced thereby. In particular urgent, for instance system-critical, updates or upgrades can be loaded quickly and without great interference.

Loading of the updates or upgrades can also be carried out without security problems in respect of the user-specific data. In particular, the database with user-specific data remains on the host system.

The term "update" is taken to mean an update, which provides slight improvements or eliminates errors. An "upgrade" refers to more major changes, for instance about a changed or expanded range of functions. An update thus refers to a new version, whereas an upgrade relates to a new variant of the software application with technical innovations.

The "software application" can in principle relate to any program, which is executed on the host system. For example, it can be a software application used in the medical sector, for instance for the diagnosis of patient data.

The data, which relates to the software application, can comprise, for example, installation files of the software application, which are stored on a partition of the host system. The data, which relates to the software application, can also comprise database data, moreover, which is stored on the same partition or on a different partition of the host system. The database data can be user-specific, for instance patient data or diagnostic data for the example of a software application used in the medical sector.

The first or second map is an image, as can also be applied for instance for backups of partitions.

In accordance with one embodiment of the method for upgrading or updating the software application, generating the first map of the at least one partition of the host system comprises generating a backup of the operating system of the host system. An appropriate hard disk container file with the partition pattern of the hard disk of the host system is generated for at least one hard disk of the host system. The operating system of the host system is restored on a corresponding partition in the hard disk container file with the aid of the backup of the operating system. In the VM environment the hard disk container file can thus be mounted in such a way that when starting the VM environment a copy of the host system with corresponding hard disk and partition structure is started in the VM environment. The software application is thus updated or upgraded inside the VM environment analogously to an update or upgrade customary in the prior art directly on the host system.

In accordance with one embodiment of the method for upgrading or updating the software application, further database files and/or installation files for updating or upgrading the data relating to the software application is stored in the container file. As a result, the update or upgrade mechanisms can also be tested in the VM environment with the database present on the host system in order to identify potential installation errors early and minimize the risk for the user. The database files can be, for example, patient-specific data. It can be provided, however, that the database files are not overwritten when the second map is loaded, and instead the database files that have remained on the host system and have possibly been revised in the meantime are retained.

In accordance with one embodiment of the method for upgrading or updating the software application, firstly a function test of the software application is carried out inside the VM environment before generating the second map. It is consequently possible to ensure that the update or upgrade has been successfully carried out. Since the data, which is assigned to the software application, is available substantially identically inside the VM environment, it is consequently also possible to ensure that the software application can also be executed on the host system without errors following the upgrade or update when subsequently loading the second map.

In accordance with one embodiment of the method for upgrading or updating the software application, the second map is only generated if the function test of the software application and the installation is successful. If the function test of the software application or the installation procedure indicates that an error occurs, an error message can be output to a user. The method for upgrading or updating the software application can also be terminated to release resources of the host system.

In accordance with one embodiment of the method for upgrading or updating the software application, database data of the host system, which relates to the software application, is retained when loading the second map. The user can thus also continue to use the software application during the majority of the installation without the threat of loss of data. The time during which the software application is not available can be significantly reduced therefore.

In accordance with one embodiment of the method for upgrading or updating the software application, an error message is output if the updating or upgrading of the data relating to the software application inside the VM environment takes longer than a predefined maximum duration. If the time, which has elapsed since the beginning of the update or upgrade procedure, exceeds a predefined threshold value, for instance a multiple of the typically expected time, which can be strictly specified as a function of the update or upgrade, the error message is output. The method for upgrading or updating the software application can then also be automatically terminated so the used resources of the host system are released again. It can also be provided that individual sub-steps, for instance steps preceding or following the update or upgrade, have a separate timeout.

In accordance with one embodiment of the method for upgrading or updating the software application, when an error occurs it can be suggested to the user that they start the procedure or installation process anew in the VM environment with a new map following adjustment of the host system or elimination of the error on the host system.

In accordance with one embodiment of the method for upgrading or updating the software application, the host system is executed in a VM environment. The VM container with the restored map is thus executed inside a nested second VM environment.

In accordance with one embodiment of the method for upgrading or updating the software application, the at least one partition of the host system, from which the first map is generated, contains all data which relates to the software application. In particular, both installation files and personalized files, for instance database files, can be incorporated.

In accordance with one embodiment of the method for upgrading or updating the software application, after predefined time intervals it is possible to check whether an upgrade or update is available. If an upgrade or update is available, the installation of the upgrade or update can be carried out automatically. Alternatively, the user can be informed about the upgrade or update. The user can enter or select a desired installation time.

In accordance with one embodiment of the method for upgrading or updating the software application, a plurality of installations can be carried out simultaneously. Only the installations that proceed without errors are finalized, i.e., the corresponding second maps are actually loaded.

In accordance with one embodiment of the apparatus, the computing facility is adapted to generate a backup of the operating system of the host system, to generate for at least one hard disk of the host system a hard disk container file with the partition pattern of the hard disk of the host system, and to restore the operating system of the host system on a corresponding partition in the hard disk container file with the aid of the backup of the operating system.

In accordance with one embodiment of the apparatus, the computing facility is also adapted to store database files and/or installation files for updating or upgrading the data relating to the software application in the container file.

In accordance with one embodiment of the apparatus, the computing facility is also designed to firstly carry out a function test of the software application inside the VM environment before the creation of the second map. In addition, it can be provided that a user manually carries out an extended test of the software application inside the VM environment before loading the second map on the host system.

In accordance with one embodiment of the apparatus, the computing facility is also adapted to load the second map only if the function test of the software application is successful.

FIG. 1 shows a schematic block diagram of an apparatus 1. The apparatus 1 comprises a storage facility 2 with at least one hard disk, with each hard disk comprising at least one partition for storing data. Stored on the at least one hard disk is an operating system with a software application or with the data relating to the software application. The data comprises, for instance, installation files for execution of the software application. The data can also comprise database data, which the software application accesses, which can be specifically changed or expanded during running of the software application. The installation files can be stored in a first partition and the database data (application files) in a second partition.

The storage facility 2 can be a volatile or non-volatile storage device, for instance a hard disk, memory card or the like.

The apparatus also comprises a computing facility 3, which is adapted to execute the software application. The computing facility 3 can comprise software and/or hardware components, for instance CPUs (central processing unit), GPUs (graphics processing unit), microcontrollers, integrated circuits, ASICs (application-specific integrated circuit), FPGAs (field programmable gate array) or the like.

The apparatus 1 also comprises an interface 5, which is coupled to an external apparatus 6. The interface 5 can be designed for the input and output of data and can comprise, for example, WLAN, Bluetooth, Profibus, Ethernet interfaces or similar. The interface 5 can also be configured for connection to electrical or optical cables. The external apparatus 6 can be, for example, a backend server, which is run by a manufacturer of the software application. The packet with the installation files transferred from the backend server to the target system. It is subsequently possible to carry out the update or upgrade. The installation files can be received from the external apparatus 6 via the interface 5.

The apparatus 1 comprises a user interface 4, via which it is possible to display to the user that an upgrade or update is available. The user can confirm that the upgrade or update is to be carried out. The user can also indicate or select a desired time for carrying out the update or upgrade.

It can also be provided, however, that the upgrade or update is automatically carried out as soon as the upgrade or update is available. The update or upgrade can also be automatically carried out in the background. On successful installation in the VM environment the restore can also be automatically carried out at the defined instant.

Finally, after predefined time intervals it is possible to check whether an upgrade or update is available.

Further installation data, which is necessary for the update or upgrade, can be received from the external apparatus via the interface 5. The installation files are stored in the storage facility 2.

For upgrading or updating the software application the computing facility 3 is also adapted to generate a first map of the operating system, with data which pertains to the software application also being stored.

The computing facility 3 can be adapted to generate the first map of the operating system of the host system, to generate for at least one hard disk of the host system a hard disk container file with the partition pattern of the hard disk of the host system, and to restore the operating system of the host system on a corresponding partition in the hard disk container file with the aid of the backup of the operating system.

The computing facility 3 can also store database files and/or installation files for updating or upgrading the data relating to the software application in the container file.

The computing facility 3 generates a virtual machine, VM, environment and mounts the at least one created hard disk container file. The virtual machine is subsequently started.

The computing facility 3 is designed to update or upgrade the software application inside the VM environment.

The computing facility 3 can also carry out a function test of the software application inside the VM environment. If the function test was successful, the computing facility 3 generates a second map on the basis of the mounted first map using the updated or upgraded data relating to the software application.

The computing facility 3 loads the second map in the host system 1 outside of the VM environment, with the data relating to the operating system of the host system 1 being replaced by the changed operating system with the updated or upgraded data relating to the software application. The software application is consequently brought up-to-date. The steps, which precede loading of the second map, can be carried out in the background without user input.

Figure 2:
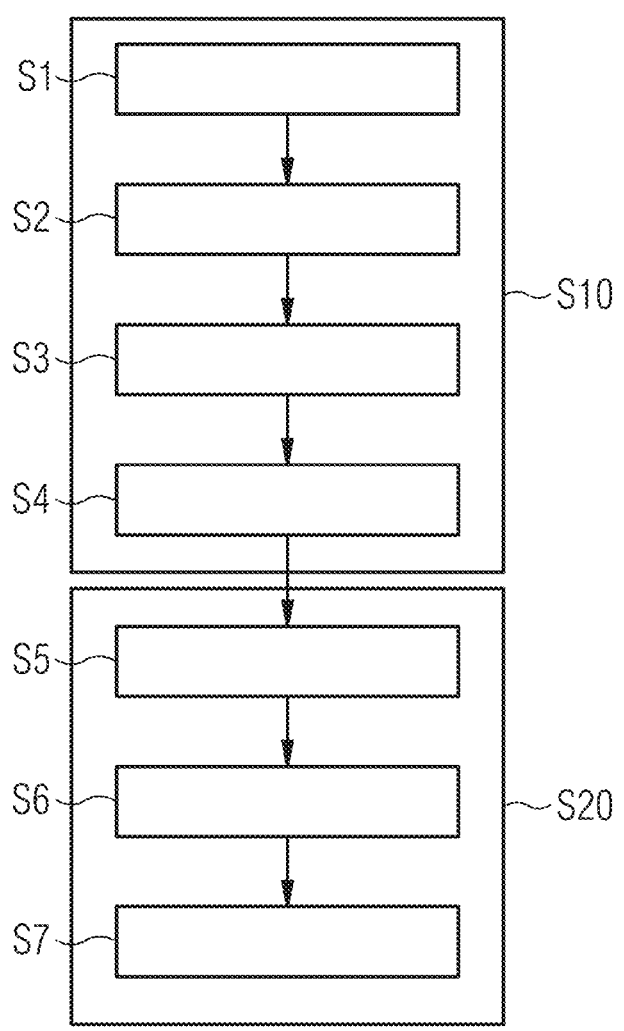
FIG. 2 shows a flow diagram of a method for upgrading or updating a software application in accordance with one embodiment of the present invention.

FIG. 2 shows a flow diagram of a method for upgrading or updating a software application.

The installation of the update or upgrade of the software application may be divided into a first stage S10 and a second stage S20, wherein at least the first stage S10, and, if desired, also the second stage S20, manages without user inputs (silent installation). The user can continue to use the host system 1 during the first stage S10 without having to intervene in the installation process. The first stage S10 of the method can preferably also be carried out outside of the customary usage period, for instance during the night or during the weekend.

The first stage S10 comprises first to fourth steps S1 to S4.

In a first step S1, method steps preceding the update or upgrade (presteps) are carried out on the host system 1. These steps comprise, for example, setting up a new script-log folder or checking whether the operating system of the host system 1 is compatible with the update or upgrade. In addition, installation files can be checked. It is possible to check whether the hardware of the host system 1 meets the requirements of the updated or upgraded version of the software application. Licenses of programs necessary for the update or upgrade can be checked. In addition, the language settings can be adjusted. The integrity of the installation files can be verified. In addition, at the end of the presteps a Schedule Task can be setup for the installation of the updates or upgrades, so the procedure for cloning and the installation can be carried out at a defined instant.

Once the method steps preceding the update or upgrade have been successfully carried out, a first map is generated by the operating system of the host system 1 in a method step S2. The first map is restored on a partition in a hard disk container file and the hard disk container file is mounted.

In a method step S3, the software application is updated or upgraded inside a VM environment.

For this, firstly steps for the successful conclusion of a cloning procedure take place, for instance an adjustment of partition names or letters and starting of the application. Method steps preceding the update or upgrade (presteps) are subsequently carried out in the VM environment. For example, necessary programs can be updated or installed, the firewall status can be checked. In addition, the integrity of the software packets for upgrading or updating can be checked. Possible backup of configurations can be setup. Database requirements can be checked. Configurations can be adjusted.

The actual update or upgrade of the software application is subsequently carried out.

Finally, further method steps can be carried out, which follow the update or upgrade. For example, the version can be adjusted and a backup of the configuration can be created once again after the installation. Furthermore, it is possible to search for installation errors, or steps from the presteps can be reversed again, for instance by activating Schedule Tasks.

In a method step S4, a second map is generated.

The second stage S20 follows with method steps S5 to S7. In the second stage S20, the second map is loaded inside the host system 1.

For this purpose, the user can be prompted to start loading the updates or upgrades, S5. It can be provided that the user selects or predefines a time at which the updated or upgraded data relating to the software application should be loaded.

Furthermore, it is firstly possible to wait until no user is logged on. A backup of the database files, which relate to the software application, can subsequently be carried out. In the case of a faulty installation the previous version of the database can be restored using this backup. A potential data exchange with external apparatuses 6 can be terminated or stopped or it is possible to wait until the data exchange has finished. For example, in the case of a medical application, data can be exchanged using the Digital Imaging and Communications in Medicine (DICOM) standards. In addition, particular dependencies or preconditions can be checked. In addition, information can be displayed to the user, for instance in respect of the updates or upgrades to be loaded.

The second map is subsequently loaded inside the host system 1 in a method step S6. The operating system is replaced by the operating system with the updated or upgraded software application here.

Database data of the host system 1, which relates to the software application, can be retained when loading the second map. For example, only one partition can be loaded, which relates to the installation files of the software application. A further partition, which contains user-specific database files, can be retained. The user can thus also continue to work with the software application during the installation, with newly added changes being adopted in the database.

Finally in a method step S7, subsequent steps (poststeps) can be carried out by updating, for example, database structures which were not part of the backed-up map.

FIG. 3 shows a schematic block diagram of a computer program product P with executable program code PC. The executable program code PC, when executed on a computer, is adapted to carry out the above-described method.

FIG. 4 shows a schematic block diagram of a non-volatile, computer-readable storage medium M with executable program code MC adapted to carry out the above-described method when executed on a computer.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the present invention has been illustrated and described in more detail by the preferred exemplary embodiments, it is not limited by the disclosed examples and a person skilled in the art can derive other variations here from without departing from the scope of the present invention.

What is claimed is:

1. A computer-implemented method for upgrading or updating a software application installed on a host system, the computer-implemented method comprising:
   generating a first map of an operating system of the host system;
   starting the first map of the operating system inside a virtual machine environment;
   updating or upgrading the software application in the virtual machine environment, the software application being included in the first map of the operating system;
   performing a function test of the software application inside the operating system in the virtual machine environment before generating a second map of the operating system;
   generating the second map of the operating system with the updated or upgraded software application in the virtual machine environment; and
   loading the second map of the operating system with the updated or upgraded software application inside the host system outside of the virtual machine environment,
   wherein the software application is available in the host system during the updating or the upgrading of the software application in the virtual machine environment.

2. The computer-implemented method as claimed in claim 1, wherein the generating the first map of the operating system of the host system comprises:
   generating a backup of the operating system of the host system;
   generating, for at least one hard disk of the host system, a hard disk container file with a partition pattern of the at least one hard disk of the host system; and
   restoring the operating system of the host system on a corresponding partition in the hard disk container file utilizing the backup of the operating system.

3. The computer-implemented method as claimed in claim 2, wherein the hard disk container file stores at least one of further database files or installation files for updating or upgrading data relating to the software application.

4. The computer-implemented method as claimed in claim 2, further comprising:
   retaining database data of the host system, which relates to the software application, when loading the second map.

5. The computer-implemented method as claimed in claim 1, wherein the second map is generated only in response to the function test of the software application being successful.

6. The computer-implemented method as claimed in claim 1, further comprising:
   retaining database data of the host system, which relates to the software application, when loading the second map.

7. The computer-implemented method of claim 6, wherein the database data of the host system includes updated data obtained via the software application of the host system during the updating or the upgrading of the software application in the virtual machine environment.

8. The computer-implemented method as claimed in claim 1, wherein when the updating or upgrading the software application takes longer than a maximum threshold duration, the method further comprises at least one of (i) outputting an error message or (ii) terminating the computer-implemented method for upgrading or updating the software application.

9. The computer-implemented method as claimed in claim 1, wherein the host system is executed in a second virtual machine environment.

10. An apparatus comprising:
    a memory storing an operating system of a host system with data relating to a software application; and
    one or more processors configured to execute the software application in the host system, and to upgrade or update the software application by generating a first map of the operating system,
starting the first map of the operating system inside a virtual machine environment,
updating or upgrading the software application in the virtual machine environment, the software application being included in the first map of the operating system,
perform a function test of the software application inside the operating system in the virtual machine environment before generating a second map of the operating system,
generating the second map of the operating system with the updated or upgraded software application in the virtual machine environment, and
loading the second map of the operating system with the updated or upgraded software application in the host system outside of the virtual machine environment outside of the virtual machine environment,
wherein the software application is available in the host system during the updating or the upgrading of the software application in the virtual machine environment.

11. The apparatus as claimed in claim 10, wherein for generating the first map, the one or more processors are configured to
generate a backup of the operating system,
generate, for at least one hard disk of the apparatus, a hard disk container file with a partition pattern of the at least one hard disk of the apparatus, and
restore the operating system on a corresponding partition in the hard disk container file utilizing the backup of the operating system.

12. The apparatus as claimed in claim 11, wherein the one or more processors are configured to store at least one of database files or installation files in the hard disk container file, for updating or upgrading data relating to the software application.

13. The apparatus as claimed in claim 10, wherein the one or more processors are configured to store at least one of database files or installation files in a hard disk container file, for updating or upgrading data relating to the software application.

14. The apparatus as claimed in claim 10, wherein the one or more processors are configured to generate the second map only in response to the function test of the software application being successful.

15. A non-transitory computer program product including executable program code that, when executed on a computer, causes the computer to carry out the method as claimed in claim 1.

16. A non-transitory computer-readable storage medium storing executable program code that, when executed on a computer, causes the computer to carry out the method as claimed in claim 1.

* * * * *